United States Patent
Oh et al.

(10) Patent No.: US 8,880,074 B2
(45) Date of Patent: Nov. 4, 2014

(54) OPERATING METHOD OF CSG FEMTO BASE STATION, HANDOVER METHOD OF HANDOVER TO CSG FEMTO BASE STATION AND MANAGING METHOD OF MANAGING INFORMATION OF NEIGHBORING CSG FEMTO CELL

(75) Inventors: Sang Chul Oh, Daejeon (KR); Seung-Que Lee, Daejeon (KR); Hyung Deug Bae, Daejeon (KR); Jun Sik Kim, Seoul (KR); Kyong Tak Cho, Daejeon (KR); Byung-Han Ryu, Daejeon (KR); Nam Hoon Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1 day.

(21) Appl. No.: 13/555,566

(22) Filed: Jul. 23, 2012

(65) Prior Publication Data

US 2013/0150042 A1    Jun. 13, 2013

(30) Foreign Application Priority Data

Dec. 8, 2011    (KR) .................. 10-2011-0131100

(51) Int. Cl.
*H04W 36/00*    (2009.01)
*H04W 84/04*    (2009.01)
(52) U.S. Cl.
CPC ........ *H04W 36/0005* (2013.01); *H04W 84/045* (2013.01)
USPC ......................................... 455/436

(58) Field of Classification Search
CPC ... H04W 84/045; H04W 48/20; H04W 36/08; H04W 36/0005; H04W 36/36
USPC ......................................... 455/436
See application file for complete search history.

(56) References Cited

U.S. PATENT DOCUMENTS

| | | | |
|---|---|---|---|
| 2009/0238114 A1* | 9/2009 | Deshpande et al. | 370/328 |
| 2010/0130215 A1* | 5/2010 | Jung et al. | 455/450 |
| 2011/0171924 A1* | 7/2011 | Faccin et al. | 455/404.1 |
| 2011/0216732 A1* | 9/2011 | Maeda et al. | 370/329 |
| 2011/0261777 A1* | 10/2011 | Maeda et al. | 370/329 |
| 2012/0157095 A1* | 6/2012 | Fodor et al. | 455/434 |
| 2012/0189016 A1* | 7/2012 | Bakker et al. | 370/401 |
| 2013/0208644 A1* | 8/2013 | Jung et al. | 370/312 |

FOREIGN PATENT DOCUMENTS

| | | |
|---|---|---|
| GB | 2471402 | 12/2010 |
| KR | 1020100021076 | 2/2010 |
| KR | 1020100061334 | 6/2010 |
| KR | 1020100099605 | 9/2010 |

* cited by examiner

*Primary Examiner* — Nathan Mitchell
(74) *Attorney, Agent, or Firm* — Nelson Mullins Riley & Scarborough LLP; Anthony A. Laurentano, Esq.; Dipti Ramnarain, Esq.

(57) ABSTRACT

Disclosed is an operating method of a femto base station which includes broadcasting a plurality of public land mobile network (PLMN) identities; broadcasting a plurality of closed subscriber group (CSG) identities correlated with the plurality of PLMN identities; and establishing wireless communication with user equipment based on the broadcasted PLMN and CSG identities.

6 Claims, 12 Drawing Sheets

```
SystemInformationBlockType1 ::=           SEQUENCE {
    cellAccessRelatedInfo       SEQUENCE {
        plmn-IdentityList           PLMN-IdentityList,
        trackingAreaCode            TrackingAreaCode,
        cellIdentity                CellIdentity,
        cellBarred                  ENUMERATED {barred, notBarred},
        intraFreqReselection        ENUMERATED {allowed, notAllowed},
        csg-Indication              BOOLEAN,
L3────▶ csg-IdentityList            CSG-IdentityList    OPTIONAL    -- Need OR
    },
    cellSelectionInfo           SEQUENCE {
        q-RxLevMin                  Q-RxLevMin,
        q-RxLevMinOffset            INTEGER (1..8)                  OPTIONAL    -- Need OP
    },
    p-Max                       P-Max                               OPTIONAL,   -- Need OP
    freqBandIndicator           INTEGER (1..64),
    schedulingInfoList          SchedulingInfoList,
    tdd-Config                  TDD-Config                          OPTIONAL,   -- Cond TDD
    si-WindowLength             ENUMERATED {ms1, ms2, ms5, ms10, ms15, ms20, ms40},
    systemInfoValueTag          INTEGER (0..31),
    nonCriticalExtension        SystemInformationBlockType1-v890-IEs            OPTIONAL
},
-- Omission
┌─────────────────────────────────────────────────────────────────────────┐
│ CSG-IdentityList ::=       SEQUENCE (SIZE (1..6)) OF CSG-Identity  ├─B1 │
└─────────────────────────────────────────────────────────────────────────┘
-- Omission
}
```

Fig. 7

| PLMN Identity List | PI1 | PI2 | ... | PIn |
|---|---|---|---|---|
| CSG Identity List | CI1 | CI2 | ... | CIn |

OPERATING METHOD OF CSG FEMTO BASE STATION, HANDOVER METHOD OF HANDOVER TO CSG FEMTO BASE STATION AND MANAGING METHOD OF MANAGING INFORMATION OF NEIGHBORING CSG FEMTO CELL

CROSS-REFERENCE TO RELATED APPLICATIONS

A claim for priority under 35 U.S.C. §119 is made to Korean Patent Application No. 10-2011-0131100 filed Dec. 8, 2011, in the Korean Intellectual Property Office, the entire contents of which are hereby incorporated by reference.

BACKGROUND

The inventive concepts described herein relate to wireless communication, and more particularly, relate to an operating method of CSG femto base station, a handover method of handover to CSG femto base station, and a managing method of managing information of neighboring CSG femto cells.

A wireless mobile network may provide a seamless wireless communication service to a wireless communication terminal having mobility. The wireless mobile network may be formed of a plurality of base stations.

Each base station may operate one cell. A base station may perform wireless communication with a wireless communication terminal placed within a corresponding cell. When a wireless communication terminal moves from one cell (e.g., a source cell) into another cell (e.g., a target cell), a base station of the target cell may establish communication with a wireless communication terminal, and a base station of the source cell may terminate communication with the wireless communication terminal. This operation may be referred to as a handover (HO). The handover may enable the wireless mobile network to provide a seamless wireless communication service to a wireless communication terminal.

Commercialized wireless mobile networks may include GSM (Global System for Mobile communication), CDMA (Code Division Multiple Access), WCDMA (Wideband CDMA), CDMA 2000, WiMAX (World interoperability for Microwave Access), LTE (Long Term Evolution), and the like.

SUMMARY

Example embodiments of the inventive concept provide an operating method of a femto base station comprising broadcasting a plurality of public land mobile network (PLMN) identities; broadcasting a plurality of closed subscriber group (CSG) identities correlated with the plurality of PLMN identities; and establishing wireless communication with user equipment based on the broadcasted PLMN and CSG identities.

In example embodiments, the femto base station is a CSG femto base station or a hybrid access mode femto base station.

In example embodiments, the femto base station is shared by a plurality of PLMN providers.

In example embodiments, the plurality of PLMN identities and the plurality of CSG identities are correlated according to a broadcasting order of themselves.

In example embodiments, a CSG identity correlated with one of the plurality of PLMN identities is broadcasted by pairs to indicate correlation.

In example embodiments, the establishing wireless communication with user equipment based on the broadcasted PLMN and CSG identities comprises receiving a selected one of the plurality of PLMN identities and a selected one of the plurality of CSG identities from the user equipment; sending the selected PLMN identity and the selected CSG identity to an evolved packet core; receiving a grant message or a refusal message from the evolved packet core; and sending a grant message or a refusal message to the user equipment according to the message received from the evolved packet core.

Example embodiments of the inventive concept also provide a handover method of user equipment performing a handover from a source base station to a closed subscriber group (CSG) femto base station. The handover method comprises selecting one of a plurality of public land mobile network (PLMN) identities broadcasted from the CSG femto base station and one of a plurality of CSG identities associated with the plurality of PLMN identities; and establishing communication with the CSG femto base station using the selected PLMN identity and the selected CSG identity.

In example embodiments, the establishing communication with the CSG femto base station using the selected PLMN identity and the selected CSG identity comprises sending a handover request including the selected PLMN identity and the selected CSG identity to an evolved packet core by the source base station; sending a handover request including the selected PLMN identity and the selected CSG identity to the CSG femto base station by the evolved packet core; sending a handover command to the source base station by the evolved packet core; and reconfiguring radio resource control connection with the CSG femto base station by the user equipment.

Example embodiments of the inventive concept also provide a managing method of a base station which manages information of a neighboring closed subscriber group (CSG) femto cell. The managing method comprises commanding to user equipment to execute a measurement report on the neighboring CSG femto cell by the base station; and sending a plurality of public land mobile network (PLMN) identities broadcasted from the neighboring CSG femto base station and a plurality of CSG identities associated with the plurality of PLMN identities to the base station by the user equipment.

In example embodiments, information indicating identities, authorized to the user equipment, from among the plurality of PLMN identities and the plurality of CSG identities is sent to the base station from the user equipment.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Figure 1:
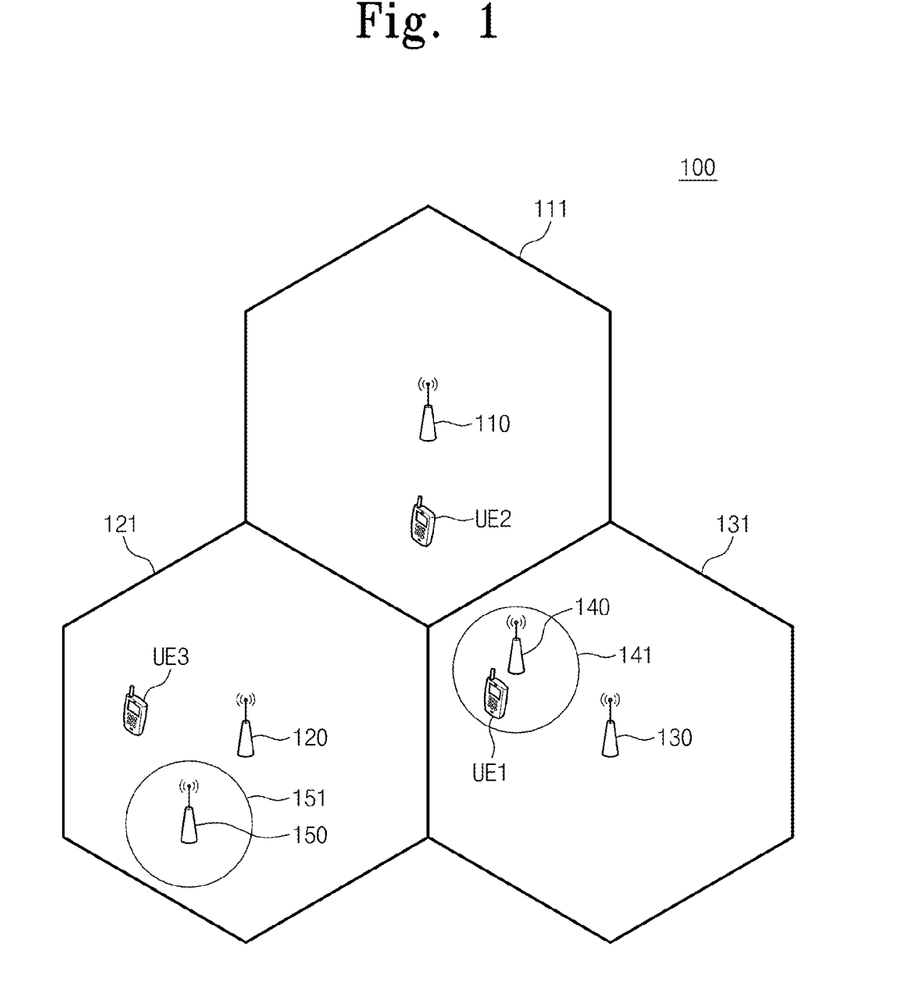
FIG. 1 is a conceptual diagram schematically illustrating a cellular network according to an embodiment of the inventive concept.

FIG. 1 is a conceptual diagram schematically illustrating a cellular network according to an embodiment of the inventive concept. Referring to FIG. 1, a cellular network 100 may include macro base stations (eNB: evolved Node B) 110, 120, and 130 and femto base stations (HeNB: Home evolved Node B) 140 and 150. The macro base stations (eNB) 110, 120, and 130 and the femto base stations (HeNB) 140 and 150 may perform wireless communication with plural user equipment UE1, UE2, and UE3.

The macro base stations 110, 120, and 130 may form macro cells (MC) 111, 121, and 131, respectively. The femto base stations 140 and 150 may form femto cells (FC) 141 and 151, respectively. Sizes of the macro cells 111, 121, and 131 may be larger than sizes of the femto cells 141 and 151.

The macro cells 111, 121, and 131 may form a basic cell structure of the cellular network 100. The femto cell 141 and 151 may cover a shadow region or a region that the density of the user equipment is high, within the basic cell structure formed by the macro cells 111, 121, and 131.

The cellular network 100 may include different sizes of cells. That is, the cellular network 100 may be a heterogeneous network.

Each of the femto base stations (HeNB) 140 and 150 may be an open access mode base station, a closed subscriber group (CSG) base station, or a hybrid access mode base station.

In a cell of an open access mode femto base station, the user equipment UE1, UE2, and UE3 may be provided with a wireless communication service without limitation.

In a cell of a CSG femto base station, authorized user equipment of the user equipment UE1, UE2, and UE3 may be provided with the wireless communication service, and unauthorized user equipment of the user equipment UE1, UE2, and UE3 may not be provided with the wireless communication service.

In a cell of a hybrid access mode femto base station, authorized user equipment of the user equipment UE1, UE2, and UE3 may have the priority and provided with the wireless communication service, and unauthorized user equipment of the user equipment UE1, UE2, and UE3 may not have the priority and be provided with the wireless communication service.

Figure 2:
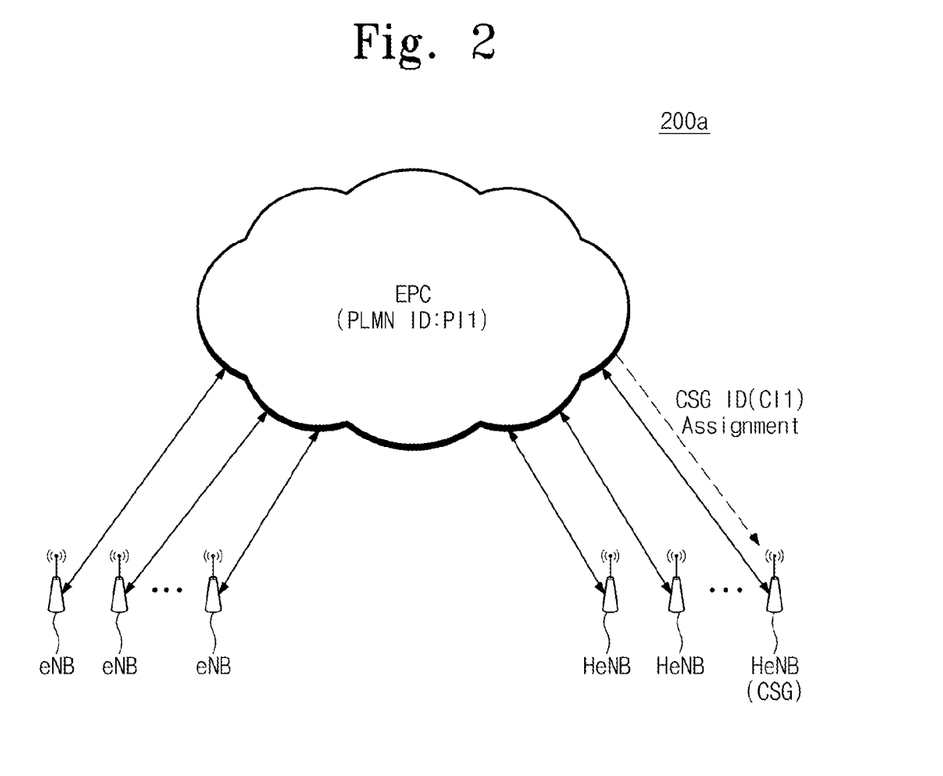
FIG. 2 is a conceptual diagram schematically illustrating a wireless communication network including a cellular network in FIG. 1 according to an embodiment of the inventive concept.

FIG. 2 is a conceptual diagram schematically illustrating a wireless communication network including a cellular network in FIG. 1 according to an embodiment of the inventive concept. Referring to FIGS. 1 and 2, a wireless communication network 200a may include an evolved packet core EPC, macro base stations eNB, and femto base stations HeNB. For ease of illustration, cells 111, 121, 131, 141, and 151 in FIG. 1 are not illustrated in FIG. 2.

The EPC may be configured to control a wireless communication network 200 and wireless communication between plural user equipment UE1, UE2, and UE3.

The macro base stations eNB, and the femto base stations HeNB may be connected with the EPC 210. The macro base stations eNB, and the femto base stations HeNB may perform wireless communicate with the user equipment UE1, UE2, and UE3 under the control of the EPC 210.

A public land mobile network (PLMN) provider using the EPC may have a PLMN identity PI1.

At least one of the femto base stations HeNB may be a CSG femto base station HeNB(CSG). The EPC 210 may allot a CSG identity CI1 to the CSG femto base station HeNB(CSG). The CSG identity CI1 may be generated according to an algorithm unique to the PLMN provider using the EPC.

Figure 3:
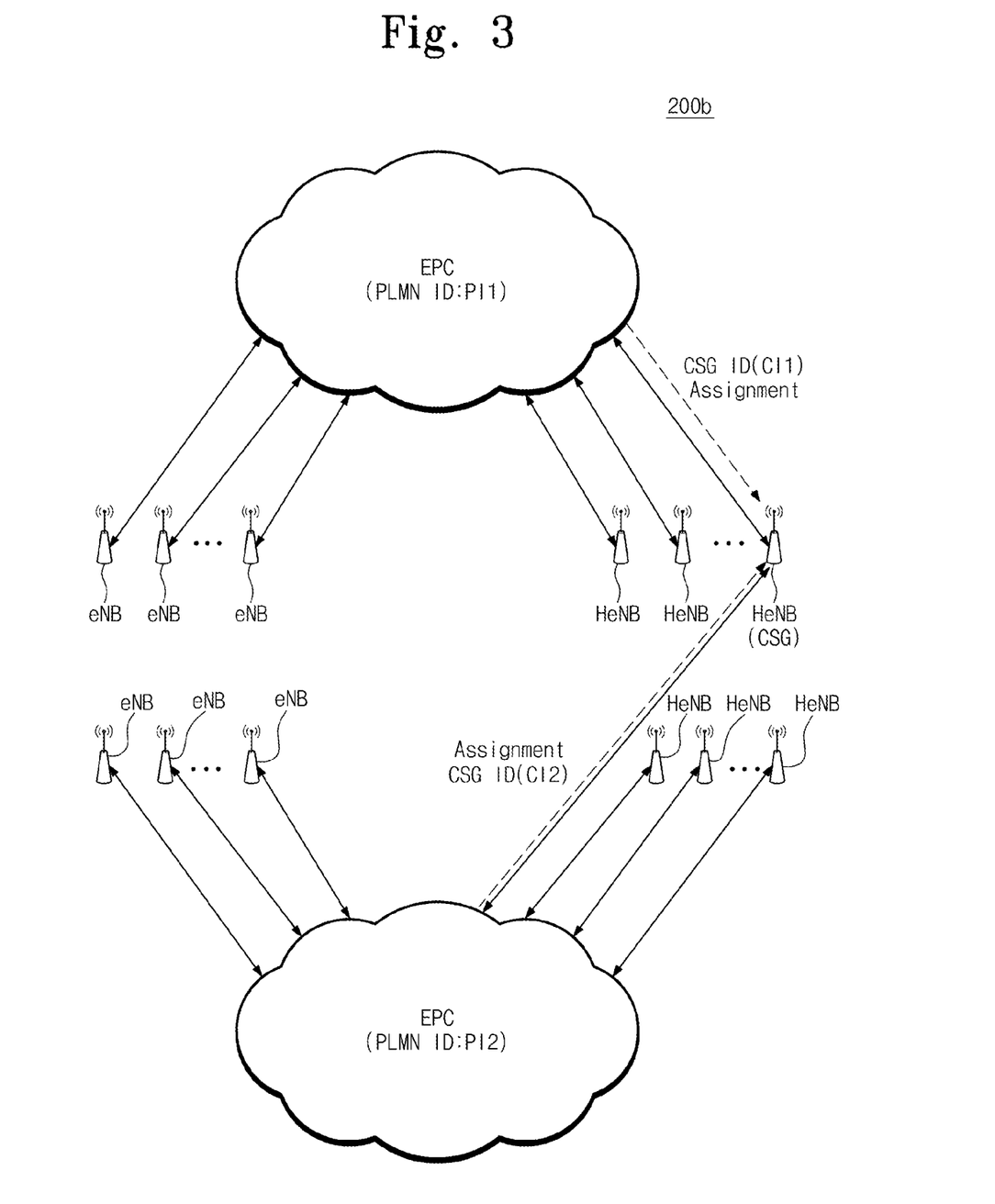
FIG. 3 is a conceptual diagram schematically illustrating a wireless communication network including a cellular network in FIG. 1 according to another embodiment of the inventive concept.

FIG. 3 is a conceptual diagram schematically illustrating a wireless communication network including a cellular network in FIG. 1 according to another embodiment of the inventive concept. Compared with a wireless communication network 200a in FIG. 2, PLMN providers using different PLMN identities PI1 and PI2 may use different EPCs. Each EPC may be connected with specific macro base stations eNB and femto base stations HeNB.

At least one CSG femto base station HeNB(CSG) may be connected in common to different EPCs. That is, at least one CSG femto base station HeNB(CSG) may be shared by different PLMN providers using different PLMN identities. For example, at least one CSG femto base station HeNB(CSG) may be shared by different PLMN providers according to conditions such as an installation cost, an installation place, and the like.

A PLMN provider using a first PLMN identity PI1 may assign a CSG identity CI1 to a CSG femto base station HeNB (CSG) according to a specific algorithm. A PLMN provider using a second PLMN identity PI2 may assign a CSG identity CI2 to a shared CSG femto base station HeNB(CSG) according to a specific algorithm. When PLMN providers use different algorithms, CSG identities CI1 and CI2 assigned to the shared CSG femto base station HeNB(CSG) may be different from each other.

Figure 4:
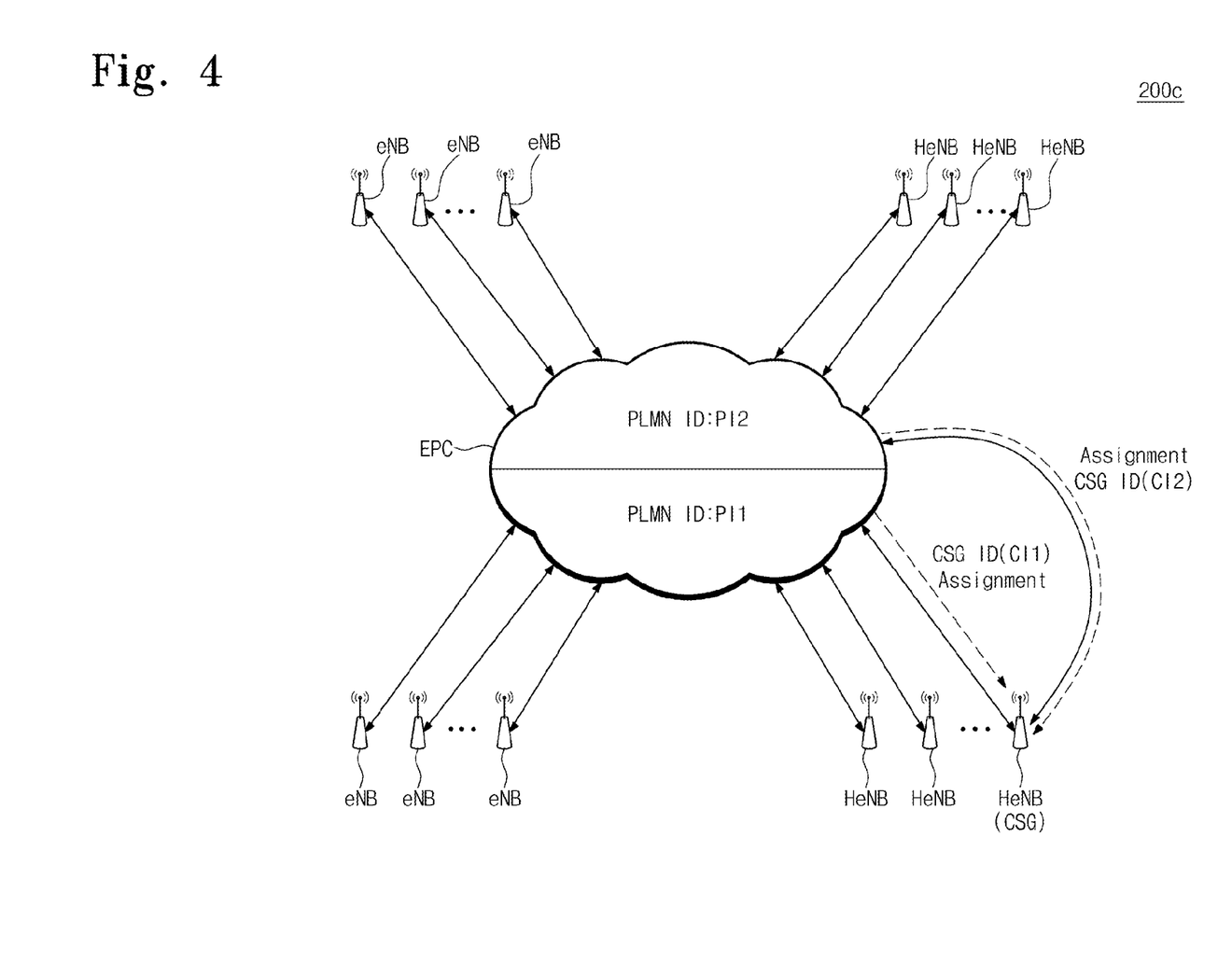
FIG. 4 is a conceptual diagram schematically illustrating a wireless communication network including a cellular network in FIG. 1 according to still another embodiment of the inventive concept.

FIG. 4 is a conceptual diagram schematically illustrating a wireless communication network including a cellular network in FIG. 1 according to still another embodiment of the inventive concept.

Compared with a wireless communication network 200b in FIG. 3, PLMN providers using different PLMN identities PI1 and PI2 may share an EPC. For example, the EPC may be shared by different PLMN providers according to conditions such as an installation cost, an installation place, and the like. Each of PLMN providers sharing the EPC may operate specific macro base stations eNB and femto base stations HeNB.

At least one CSG femto base station HeNB(CSG) may be operated in common by different PLMN providers. That is, at least one CSG femto base station HeNB(CSG) may be shared by different PLMN providers which share EPC and use different PLMN identities, respectively. For example, at least one CSG femto base station HeNB(CSG) may be shared by different PLMN providers, which share EPC and use different PLMN identities, respectively, according to conditions such as an installation cost, an installation place, and the like.

A PLMN provider using a first PLMN identity PI1 may assign a CSG identity CI1 to a CSG femto base station HeNB (CSG) according to a specific algorithm. A PLMN provider using a second PLMN identity PI2 may assign a CSG identity CI2 to a shared CSG femto base station HeNB(CSG) according to a specific algorithm. When PLMN providers use different algorithms, CSG identities CI1 and CI2 assigned to the shared CSG femto base station HeNB(CSG) may be different from each other.

That is, when a CSG femto base station HeNB(CSG) is shared by plural PLMN providers, plural PLMN identities PI1 and PI2 and CSG identities CI1 and CI2 may be allotted to the CSG femto base station HeNB(CSG). A CSG femto base station HeNB(CSG) shared by a plurality of PLMN providers may necessitate a function of managing plural PLMN identities and CSG identities.

Figure 5:
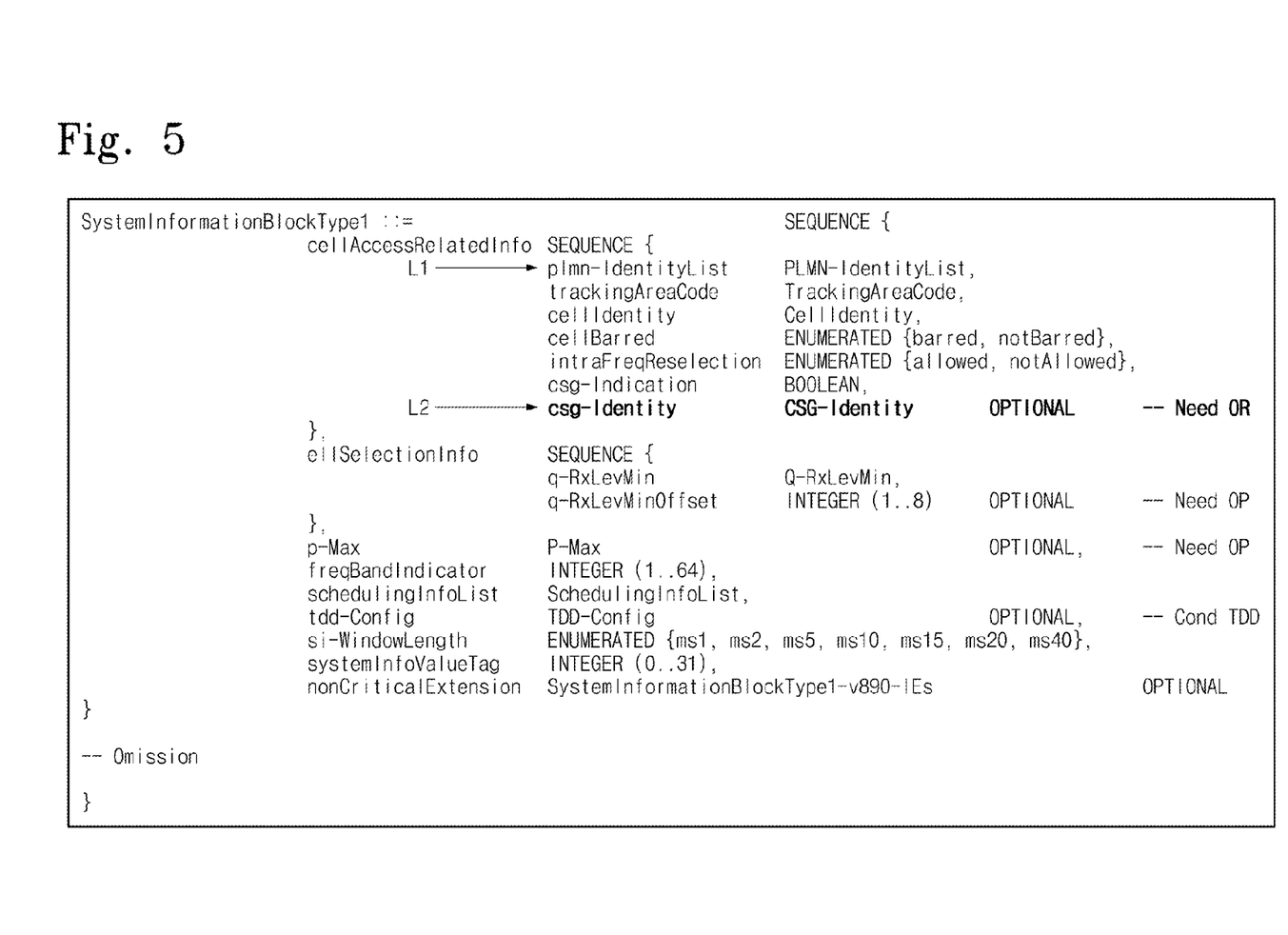
FIG. 5 is a diagram illustrating a broadcasting message broadcasted by a base station.

FIG. 5 is a diagram illustrating a broadcasting message broadcasted by a base station. Referring to FIGS. 3 to 5, in line L1, a PLMN identity list may be defined. A base station may manage PLMN identities using a list. On the other hand, in line L2, a CSG identity may be defined. That is, when a plurality of CSG identities are allotted to a CSG femto base station HeNB(CSG), the CSG femto base station HeNB (CSG) may not manage a plurality of CSG identities and broadcast a plurality of CSG identities. That is, the CSG femto base station HeNB(CSG) may not be shared by a plurality of PLMN users.

Figure 6:
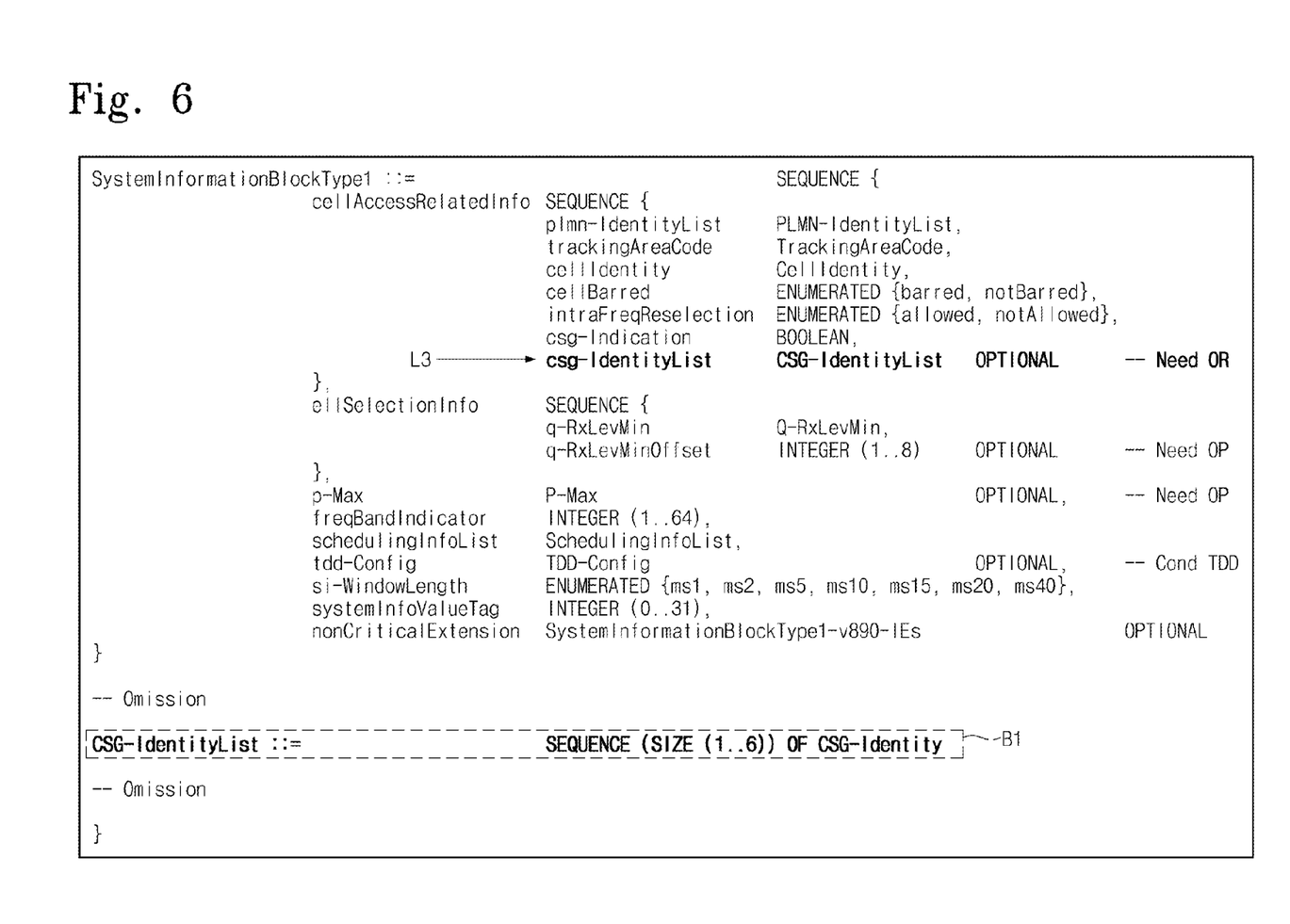
FIG. 6 is a diagram illustrating a broadcasting message broadcasted by a base station according to an embodiment of the inventive concept.

FIG. 6 is a diagram illustrating a broadcasting message broadcasted by a base station according to an embodiment of the inventive concept. Referring to FIGS. 3, 4, and 6, in line L3, CSG identities may be defined in a list type. At box B1, CSG identities may be written.

Figure 7:
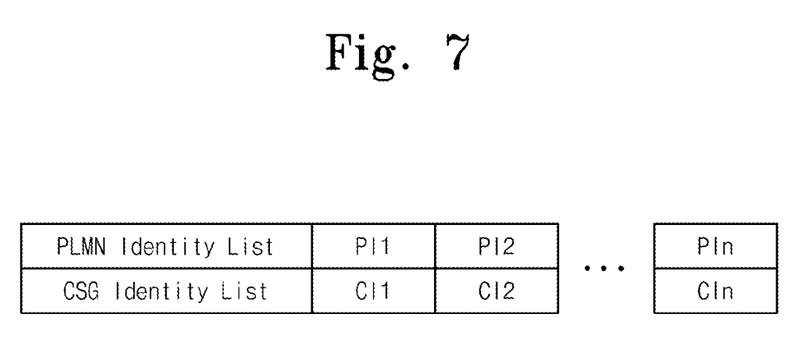
FIG. 7 is a table for describing a method of correlating PLMN identities with CSG identities using a broadcasting message broadcasted from a base station.

FIG. 7 is a table for describing a method of correlating PLMN identities with CSG identities using a broadcasting message broadcasted from a base station.

Referring to FIGS. 3, 4, 6, and 7, PLMN identities may be sequentially broadcasted. CSG identities may be sequentially broadcasted. The PLMN identities and CSG identities may be correlated according to the order from a first identity. For example, a first broadcasted PLMN identity PI1 may be correlated with a first broadcasted CSG identity CI1. That is, the first broadcasted CSG identity CI1 may be a CSG identity assigned to a CSG femto base station HeNB(CSG) by a PLMN provider using the first broadcasted PLMN identity PI1. A secondly broadcasted CSG identity CI2 may be a CSG identity assigned to a CSG femto base station HeNB(CSG) by a PLMN provider using a secondly broadcasted PLMN identity PI2. An nth-broadcasted CSG identity CIn may be a CSG identity assigned to a CSG femto base station HeNB(CSG) by a PLMN provider using an nth-broadcasted PLMN identity PIn.

The user equipment communicating with a base station eNB or HeNB may judge correlation between PLMN identities and CSG identities according to a broadcasting order of received PLMN and CSG identities. The user equipment may select authorized PLMN and CSG identities from the PLMN and CSG identities according to the judgment result.

Figure 8:
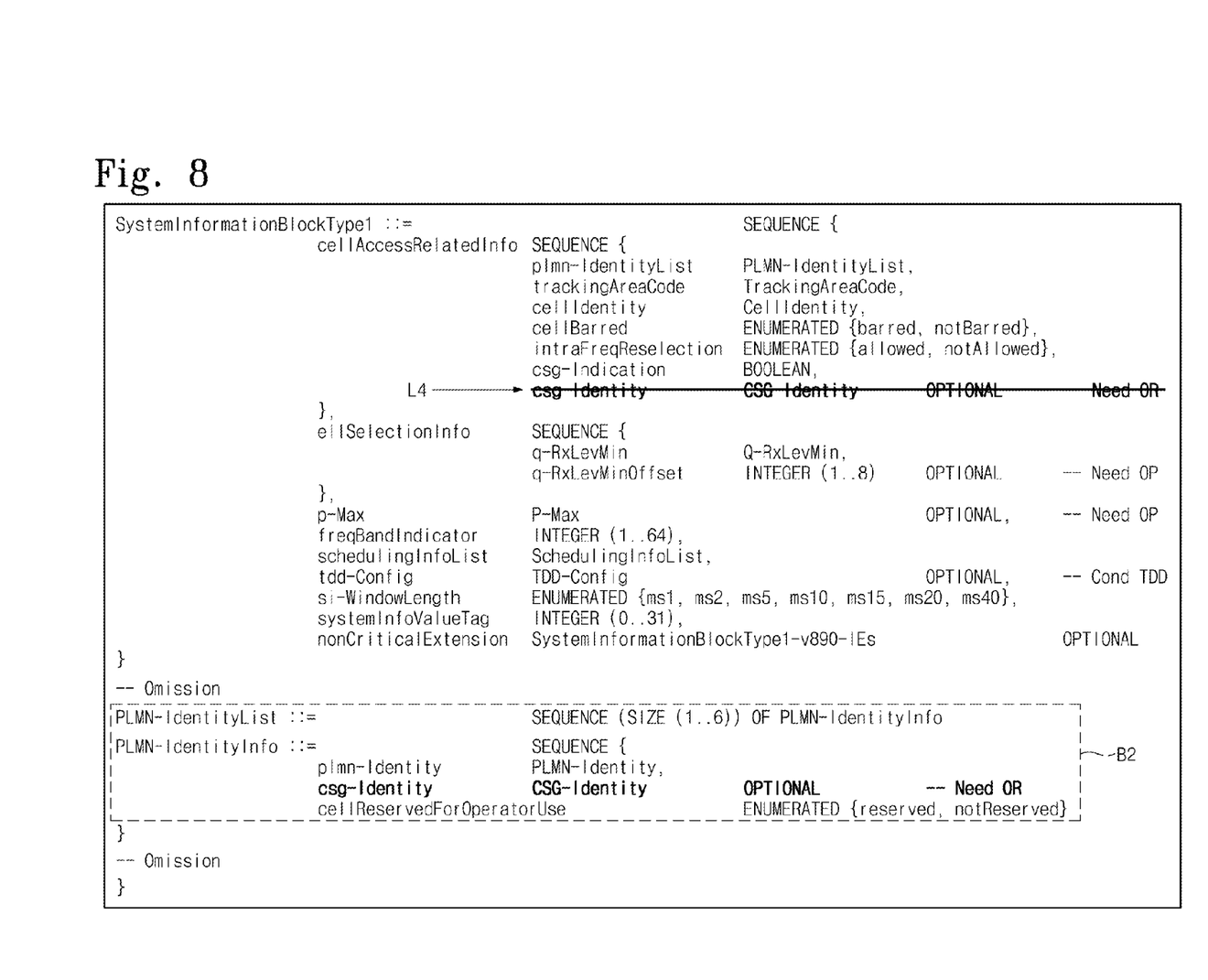
FIG. 8 is a diagram illustrating a broadcasting message of a base station according to an embodiment of the inventive concept.

FIG. 8 is a diagram illustrating a broadcasting message of a base station according to an embodiment of the inventive concept. Compared with FIG. 5, in line L4, definition of a CSG identity may be deleted. On the other hand, at box B2, a list of PLMN identities and a CSG identity correlated with each PLMN identity may be defined. That is, each PLMN identity may be broadcasted with a correlated CSG identity. The user equipment may receive correlated PLMN and CSG identities to select authorized PLMN and CSG identities.

As described above, a base station eNB or HeNB may manage and broadcast correlated PLMN and CSG identities. If the base station eNB or HeNB broadcasts correlated PLMN and CSG identities, the user equipment may receive the broadcasted PLMN and CSG identities to select authorized PLMN and CSG identities.

Figure 9:
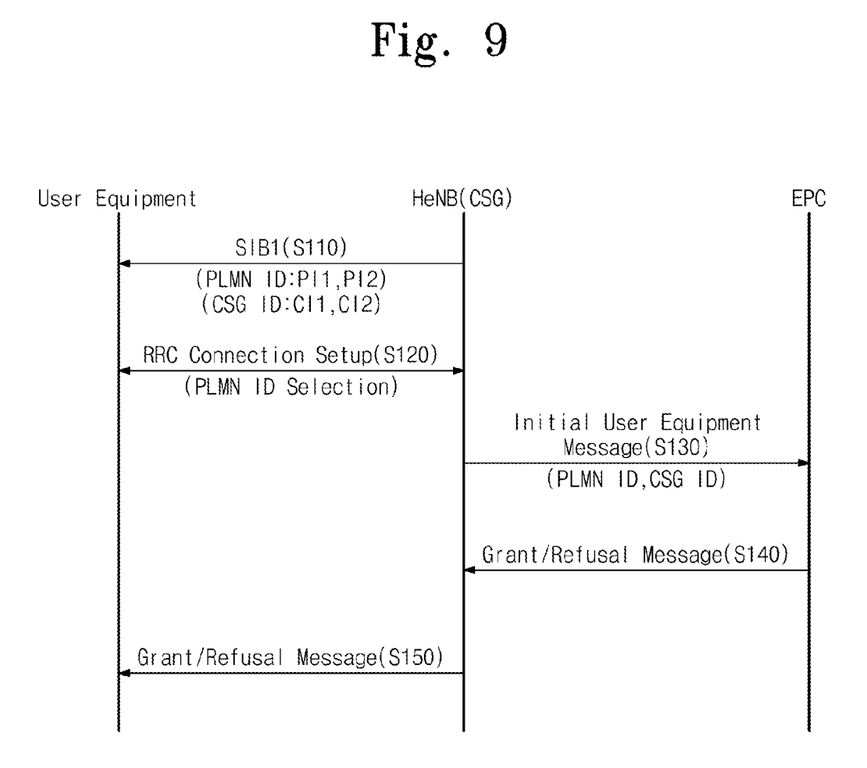
FIG. 9 is a flowchart illustrating a method of establishing communication with a CSG femto base station through the user equipment.

FIG. 9 is a flowchart illustrating a method of establishing communication with a CSG femto base station through the user equipment. Referring to FIGS. 1, 3, 4, and 9, in operation S110, a CSG femto base station HeNB(CSG) may send a broadcasting message SIB1 (SystemInformationBlock-Type1) to the user equipment UE. The broadcasting message SIB1 may include PLMN identities PI1 and PI2 of a plurality of PLMN providers and CSG identities CI1 and CI2 correlated with the PLMN identities PI1 and PI2.

In operation S120, the user equipment UE may set up radio resource control (RRC) connection with the CSG femto base station HeNB(CSG). For example, the user equipment UE may select authorized PLMN and CSG identities of the correlated PLMN and CSG identities. The user equipment may set up radio resource control (RRC) connection with the CSG femto base station HeNB(CSG) using the selected PLMN and CSG identities.

In operation S130, the CSG femto base station HeNB (CSG) may send an initial user equipment message to EPC. The CSG femto base station HeNB(CSG) may send the selected PLMN and CSG identities to the EPC using the initial user equipment message.

In operation S140, the EPC may send a grant/refusal message to the CSG femto base station HeNB(CSG). In response to a message received from the EPC, the CSG femto base station HeNB(CSG) may send a grant/refusal message to the user equipment UE. If a grant message is received, the user equipment UE may perform wireless communication with the CSG femto base station HeNB(CSG). If a refusal message is received, the user equipment UE may not perform wireless communication with the CSG femto base station HeNB (CSG).

Figure 10:
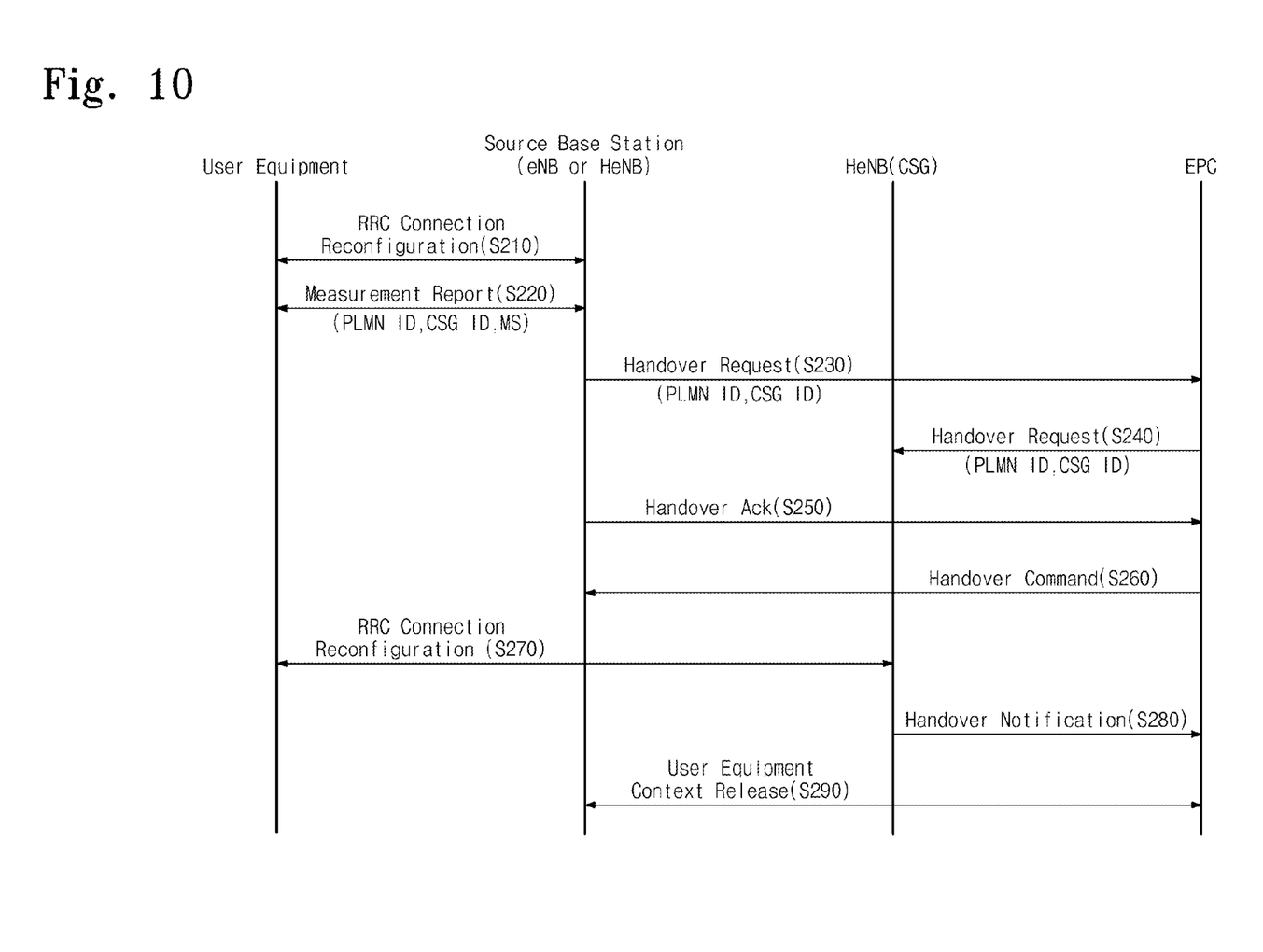
FIG. 10 is a flowchart illustrating a method of performing a handover from a source base station to a CSG femto base station by the user equipment.

FIG. 10 is a flowchart illustrating a method of performing a handover from a source base station to a CSG femto base station by the user equipment. It is assumed that a base station previously communicating with a CSG femto base station HeNB(CSG) is eNB or HeNB and a target base station to be handed over by the CSG femto base station HeNB(CSG) is a CSG femto base station HeNB(CSG).

Referring to FIGS. 1, 3, 4, and 10, in operation S210, wireless resource control (RRC) connection may be reconfigured. A source base station may require the user equipment UE, located at a cell in the source base station, to report whether a target base station for handover exists.

In operation S220, the user equipment UE may conduct a measurement report to the source base station. For example, the user equipment UE may receive a broadcasting message SIB1 transmitted from a CSG femto base station HeNB (CSG) to send authorized ones of correlated PLMN and CSG identities to the source base station as the measurement report. At the same time, the user equipment UE may send information on a member status indicating an authorized member of the CSG femto base station HeNB(CSG).

In operation S230, the source base station may provide the EPC with a handover request including a PLMN identity and a CSG identity received from the user equipment UE. The source base station may judge whether a handover to the user equipment UE is needed, based on the measurement report received from the user equipment UE. If a handover to the user equipment UE is needed, the source base station may send a handover request to the EPC.

In operation S240, the EPC may provide the CSG femto base station HeNB(CSG) with a handover request including a PLMN identity and a CSG identity. In response to the handover request, the CSG femto base station HeNB(CSG) may prepare to perform a handover of the user equipment UE.

In operation S250, the source base station may send a handover acknowledge Ack. In operation S260, the EPC may transfer a handover command to the source base station. If the handover command is received, the source base station may control the user equipment UE to be handed over. In operation S270, the user equipment UE may reconfigure RRC connection with the CSG femto base station HeNB(CSG).

If the RRC connection is reconfigured, in operation S280, the CSG femto base station HeNB(CSG) may provide the EPC with handover notification indicating that a handover is performed. If the handover notification is transmitted, in operation S290, the EPC may send a user equipment context release message to the source base station. The source base station may delete information associated with the user equipment UE in response to the user equipment context release message.

Figure 11:
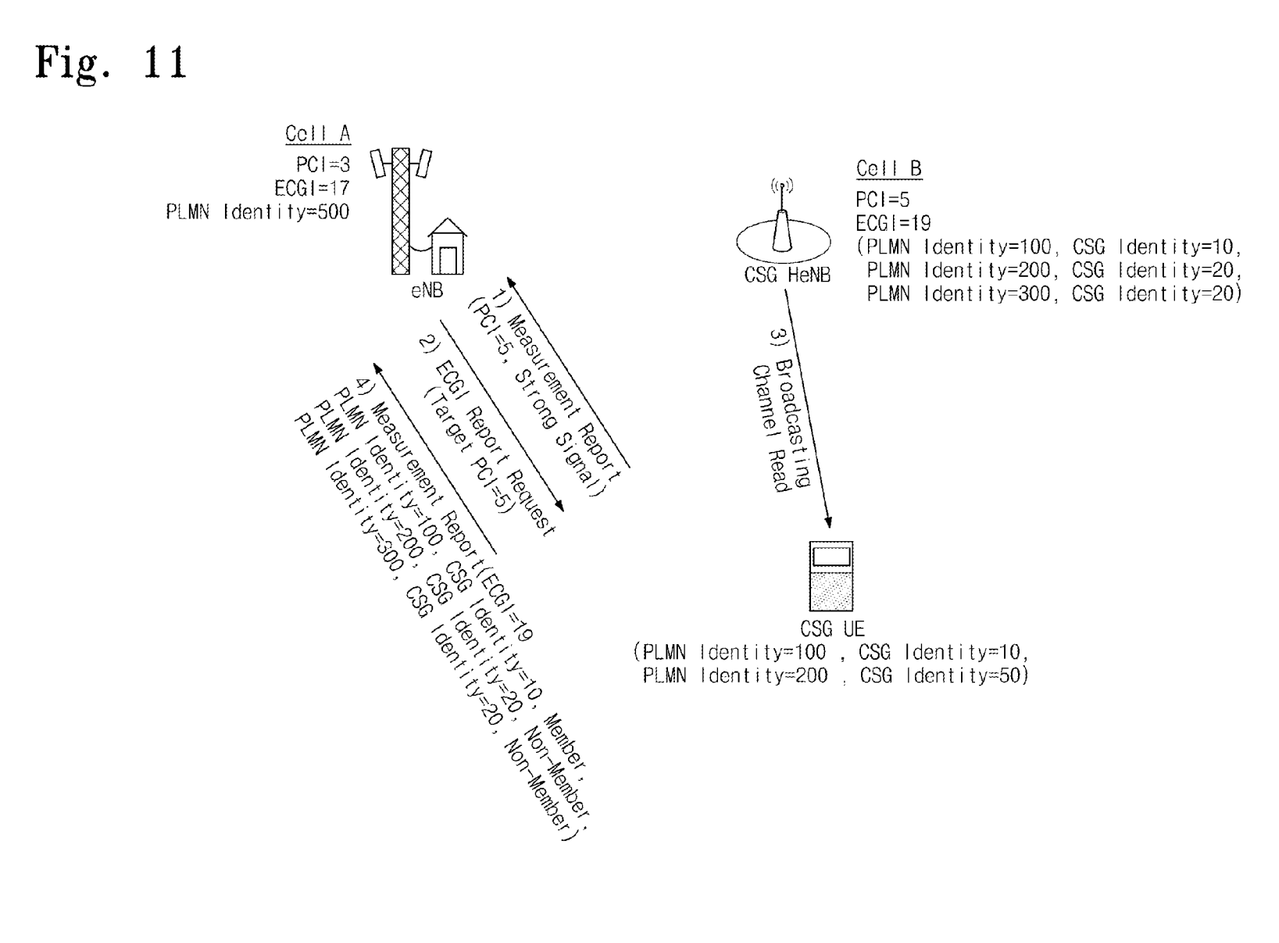
FIG. 11 is a diagram illustrating a neighboring CSG femto cell information managing method of a macro base station.

FIG. 11 is a diagram illustrating a neighboring CSG femto cell information managing method of a macro base station. In FIG. 11, there is exemplarily illustrated a process where an Automatic Neighbor function is executed by a base station.

Referring to FIGS. 1, 3, 4, and 11, the user equipment UE may request a measurement report to a macro base station eNB of a cell which the user equipment UE belongs to. The user equipment UE may receive signals transmitted from base stations of neighboring cells to acquire physical cell identifiers PCIs of the neighboring cells. The acquired PCIs may be sent to a base station. In example embodiments, the user equipment UE may the acquired PCIs of a CSG femto base station HeNB(CSG) to a base station eNB.

If the PCI of the CSG femto base station HeNB(CSG) is received from the user equipment UE, the macro base station eNB may request an ECGI (E-UTRAN Cell Global Identifier) report to the user equipment UE.

In response to a request of the macro base station eNB, the user equipment UE may read ECGI, PLMN identities, and correlated CSG identities of the CSG femto base station HeNB(CSG) from the broadcasting message SIB1 broadcasted from the CSG femto base station HeNB(CSG).

Afterwards, the user equipment UE may send the ECGI, PLMN identities, and correlated CSG identities of the CSG femto base station HeNB(CSG) to the macro base station eNB. The user equipment UE may further provide the macro base station eNB with information associated with authorized identities of correlated PLMN and CSG identities. For example, the user equipment UE may mark authorized identities by a member and unauthorized identities by a non-member.

Figure 12:
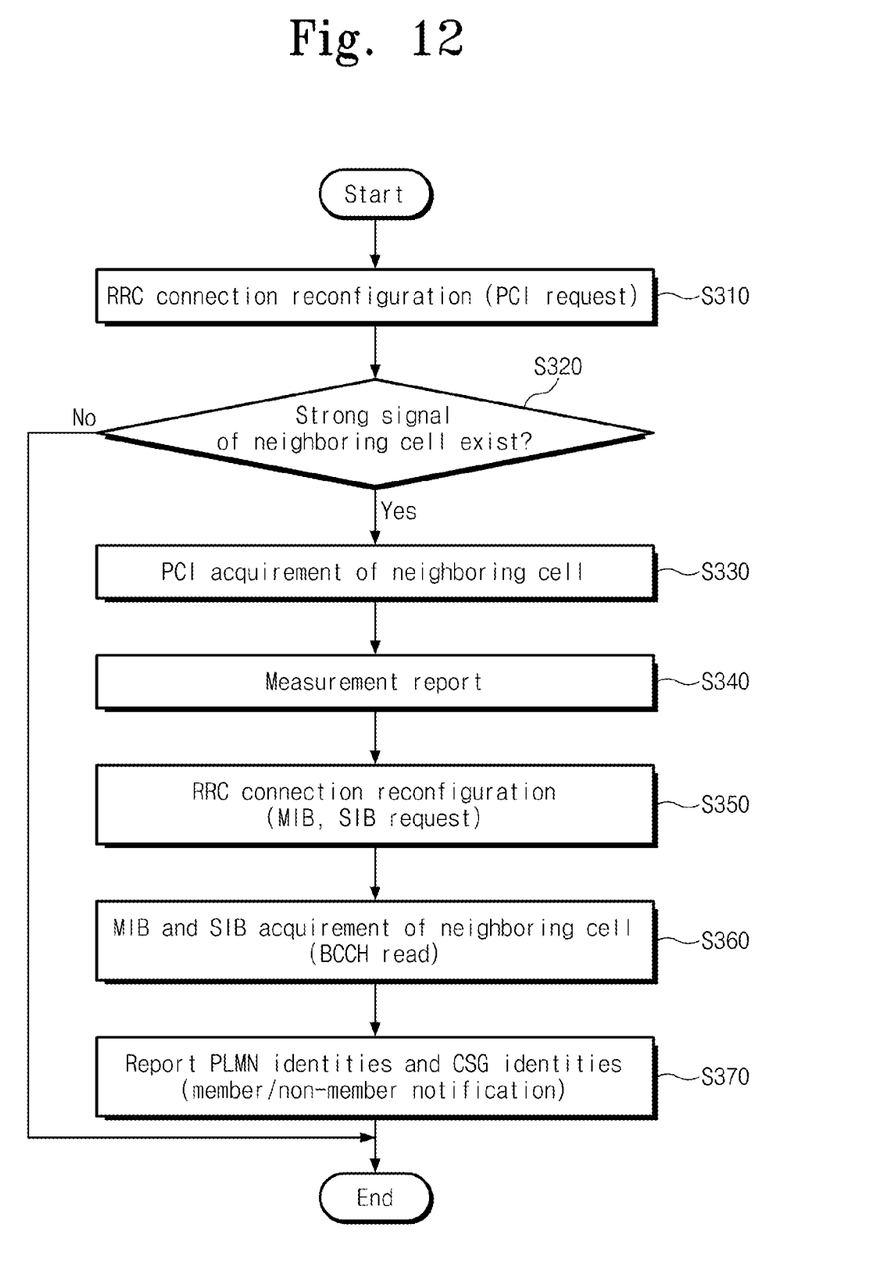
FIG. 12 is a flowchart illustrating a measurement report performing method executed by a macro base station and the user equipment.

FIG. 12 is a flowchart illustrating a measurement report performing method executed by a macro base station and the user equipment. Referring to FIGS. 11 and 12, in operation S310, a macro base station eNB and the user equipment UE may reconfigure RRC connection. At this time, the macro base station eNB may request the user equipment UE to report PCI of a neighboring cell.

In operation S320, the user equipment UE may judge whether a neighboring cell having a strong signal exists. If so, in operation S330, the user equipment UE may read an SYNC channel of the neighboring cell to acquire PCI of the neighboring cell. In operation S340, the user equipment UE may provide a measurement report including the PCI of the neighboring cell to the macro base station eNB.

In operation S350, RRC connection may be reconfigured. The macro base station eNB may require the user equipment UE to report MIB (MasterInformationBlock) and SIB (SystemInformationBlock) of the neighboring cell corresponding to the input PCI.

In operation S360, the user equipment UE may read BCCH (Broadcast Control Channel) of the neighboring cell to acquire the MIB and SIB. The user equipment UE may acquire correlated PLMN and CSG identities of the neighboring cell.

In operation S370, the user equipment UE may provide the macro base station eNB with correlated PLMN and CSG identities of the neighboring cell through the measurement report. The user equipment UE may further report authorized identities and unauthorized identities of the correlated PLMN and CSG identities.

As described above, a CSG femto base station HeNB (CSG) may manage and broadcast correlated PLMN and CSG identities. The correlated PLMN and CSG identities may be utilized upon establishing of communication between the user equipment UE and the CSG femto base station HeNB (CSG) (refer to FIG. 9), a handover (refer to FIG. 10), and execution of an ANR function. As the correlated PLMN and CSG identities are managed and broadcasted, the CSG femto base station HeNB(CSG) may be shared by a plurality of PLMN providers.

Example embodiments of the inventive concept are described using a CSG femto base station. However, the inventive concept is not limited thereto. For example, the inventive concept may be applied to other femto base stations using a closed subscriber group identity such as a hybrid femto base station.

While the inventive concept has been described with reference to exemplary embodiments, it will be apparent to those skilled in the art that various changes and modifications may be made without departing from the spirit and scope of the present invention. Therefore, it should be understood that the above embodiments are not limiting, but illustrative.

What is claimed is:

1. An operating method of a femto base station comprising:
broadcasting a plurality of public land mobile network (PLMN) identities;
broadcasting a plurality of closed subscriber group (CSG) identities correlated with the plurality of PLMN identities; and
establishing wireless communication with user equipment based on the broadcasted PLMN and CSG identities,
wherein the establishing wireless communication with user equipment based on the broadcasted PLMN and CSG identities comprises:
receiving a selected one of the plurality of PLMN identities and a selected one of the plurality of CSG identities from the user equipment;
sending the selected PLMN identity and the selected CSG identity to an evolved packet core;
receiving a grant message or a refusal message from the evolved packet core; and
sending a grant message or a refusal message to the user equipment according to the message received from the evolved packet core.

2. The operating method of claim 1, wherein the femto base station is a CSG femto base station or a hybrid access mode femto base station.

3. The operating method of claim 1, wherein the femto base station is shared by a plurality of PLMN providers.

4. The operating method of claim 1, wherein the plurality of PLMN identities and the plurality of CSG identities are correlated according to a broadcasting order of themselves.

5. The operating method of claim 1, wherein a CSG identity correlated with one of the plurality of PLMN identities is broadcasted by pairs to indicate correlation.

6. A handover method of user equipment performing a handover from a source base station to a closed subscriber group (CSG) femto base station, comprising:
selecting one of a plurality of public land mobile network (PLMN) identities broadcasted from the CSG femto base station and one of a plurality of CSG identities associated with the plurality of PLMN identities; and
establishing communication with the CSG femto base station using the selected PLMN identity and the selected CSG identity,
wherein the establishing communication with the CSG femto base station using the selected PLMN identity and the selected CSG identity comprises:
sending a handover request including the selected PLMN identity and the selected CSG identity to an evolved packet core by the source base station;
sending a handover request including the selected PLMN identity and the selected CSG identity to the CSG femto base station by the evolved packet core;
sending a handover command to the source base station by the evolved packet core; and
reconfiguring radio resource control connection with the CSG femto base station by the user equipment.

* * * * *